United States Patent [19]

Bracconier

[11] Patent Number: 4,973,254
[45] Date of Patent: Nov. 27, 1990

[54] EDUCATIONAL APPARATUS

[76] Inventor: Judy Bracconier, 2587 Park Ct., East Meadow, N.Y. 11554

[21] Appl. No.: 397,032

[22] Filed: Aug. 21, 1989

[51] Int. Cl.[5] .......................... G09B 5/00; G09B 7/00
[52] U.S. Cl. ........................ 434/324; 434/81; 434/96; 434/90; 40/361; 40/437; 40/560; 353/DIG. 3; 353/DIG. 4
[58] Field of Search .......... 434/324, 81, 96, 90, 434/368, 370, 430, 433; 353/11, 35, 36, 63, 65, DIG. 3, DIG. 4; 40/361, 437, 560

[56] References Cited

U.S. PATENT DOCUMENTS

| | | | |
|---|---|---|---|
| 1,262,180 | 4/1918 | Davies | 353/DIG. 3 |
| 2,330,799 | 10/1943 | Coker et al. | 353/DIG. 3 |
| 3,339,288 | 9/1967 | Sacks | 434/324 |
| 4,043,053 | 8/1977 | Kaye | 434/324 |
| 4,089,125 | 5/1978 | Enz et al. | 434/324 |

Primary Examiner—Richard J. Apley
Assistant Examiner—J. L. Doyle
Attorney, Agent, or Firm—James P. Malone

[57] ABSTRACT

Educational apparatus for use with an overhead projector has a transparent grid with horizontal and vertical indices for projecting a grid onto a wall screen. A plurality of removable cover pieces, keyed to the grid, cover up grid segments whereby when the transparent grid has pictorial material a student, or player, may project a particular grid segment by picking up the cover piece on that segment.

1 Claim, 2 Drawing Sheets

FIG. 5

| | A | B | C | D | E | |
|---|---|---|---|---|---|---|
| 1 | JACOB'S DREAM | | PETER DENIES JESUS | DANIEL IN THE LION'S DEN | | 1 |
| 2 | | PILOT WASHES HIS HANDS | | | THE STAR OF BETHLEHEM | 2 |
| 3 | | | THE EVIL SERPENT-SATAN | | BAPTISM IN THE RIVER JORDON | 3 |
| 4 | THE FEEDING OF THE 5,000 | NOAH'S ARK | | JONAH IS SWALLOWED BY A BIG FISH | | 4 |
| 5 | | | DAVID SLAYS GOLIATH | | JESUS IS THE LAMB OF GOD | 5 |
| 6 | JOSHUA TUMBLES THE WALLS OF JERICHO | | | JESUS IS BETRAYED BY JUDAS | ADAM AND EVE EAT THE FORBIDDEN FRUIT | 6 |
| 7 | | | THE HOLY SPIRIT | JAMES AND JOHN - THE SONS OF THUNDER | | 7 |
| 8 | MOSES RECEIVES THE TEN COMMANDMENTS | | | THE GOLDEN CALF | THE WISDOM OF SOLOMON | 8 |

EDUCATIONAL APPARATUS

This invention relates to educational apparatus and, more particularly, to means to project educational or game material onto a wall screen for testing or for game purposes.

BACKGROUND

Overhead projectors are commonly used to project information onto a wall. The present invention provides means to play educational games and exercises by providing a transparent grid and a plurality of removable cover pieces indexed to a grid.

PRIOR ART

No prior art is known which utilizes an overhead projector and a plurality of removable cover pieces which are indexed to a projected grid in order to play a game or do exercises.

THE INVENTION

Educational apparatus for use with an overhead projector has a transparent grid with horizontal and vertical indices for projecting a grid onto a wall screen.

A plurality of removable cover pieces, keyed to the grid, cover up grid segments whereby when the transparent grid has pictorial material, a student, or player, may project a particular grid segment by picking up the cover piece on that segment.

OBJECTS OF THE INVENTION

A principal object of the invention is to provide new and improved educational apparatus.

Another object of the invention is to provide new and improved educational apparatus utilizing an overhead projector which projects a grid with pictorial material and a plurality of removable cover pieces indexed to the grid.

Another object of the invention is to provide new and improved educational apparatus for use with an overhead projector comprising, a transparent grid with horizontal and vertical indices for projecting a grid on a wall screen and a plurality of removable cover pieces keyed to the grid to cover up grid segments whereby when t he transparent grid has pictorial material a student may project a particular grid segment by picking up the cover piece on that segment.

These, and other objects of the invention will be apparent from the following specifications and drawings, of which FIG. 1 is a diagramatic view, illustrating the use of the invention.

FIG. 5 is a plan view of a typical transparency, illustrating pictorial material for educational exercises or games.

Figure 1:
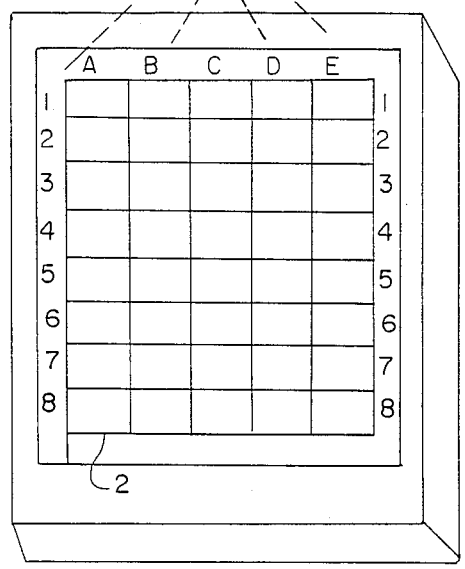

Referring to FIG. 1, conventional overhead Projector 1 is adapted to project a grid from a transparency 2 into the wall screen 3.

Figure 2:
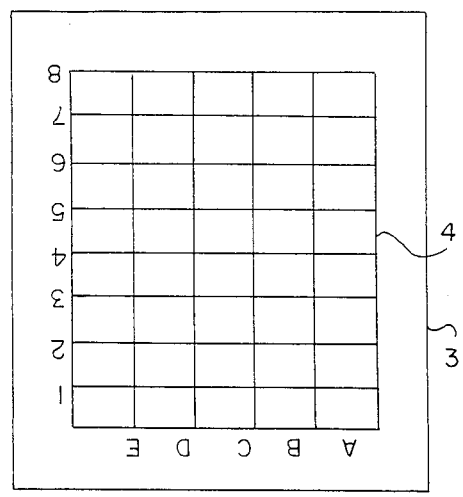
FIG. 2 is a top view of the transparent grid which is projected.

FIG. 2 is a plan view of a typical grid transparency 4, mounted on the projector 1. The transparency has horizontal and vertical rows of segments which are indexed A, B, C, D, E in one direction, and numbered 1–8 in the perpendicular direction so that each grid segment may be identified; for instance, A1, A2, etc.

Figure 3:
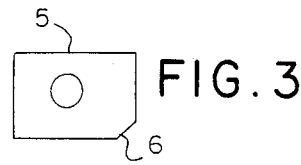
FIG. 3 is a top view of a removable cover piece.
Figure 3A:
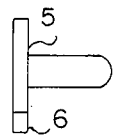
FIG. 3A is a side view of FIG. 3.
Figure 4:
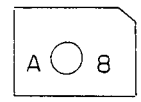
FIG. 4 is a diagram illustrating indexing of the cover pieces to the grid.
Figure 4:
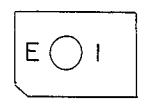
Figure 4:
Figure 4:
Figure 4:
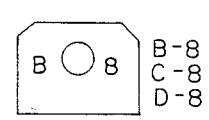
Figure 4:
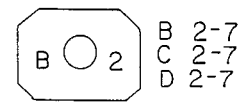

FIG. 3 shows a top view of a removable cover member 5, which is shaped to cover one grid segment. The cover pieces have a notch 6 in one corner so that when the grid is covered with the cover pieces a grid pattern will still be projected.

The cover pieces for the edge rows do not have notches along the outer edges. The cover pieces are indexed to the grid; for instance, A1, A2, etc.

Briefly, in order to play the game or conduct the exercise, the transparency with the pictorial information and the grid is placed on the projector and all the cover pieces are placed so as to cover the entire grid. In order to answer a question, or exercise, the student will choose to lift one of the cover pieces to project the answer onto the wall screen. In answer to successive questions or other clues, the answers to the problem will be projected when the correct cover pieces are removed.

OPERATION

A game presentation is projected by an overhead projector which projects gridded acetate transparencies representing a game board. The transparencies may contain a variety of matching pairs of information, or contain pictorial rebus puzzles. The game apparatus is a means of projecting these acetate game boards on the overhead projector in a manner where predetermined portions of the transparency are exposed while the rest of the transparency remains blocked out.

Any portion can be uncovered by using the moveable rubber "cover-ups". The rebus puzzles and gameboard have been drawn in a rigid fashion. Forty rubber cover-ups are placed on each of the gridded rectangles. A set of 40 is used to cover the entire $7.5'' \times 8''$ gridded drawing. The $1.5'' \times 1.0''$ individual cover-ups are arranged in horizontal lines. Five pieces complete a line and there are 8 lines—thus, totalling the 40 individual pieces. Each of the pieces has an embossed letter and numeral on the top side so as to identify its particular location on the gridded transparency. On the center face of each piece is a molded cylindrical handle extending upward $0.750''$, which allows for ease of lifting and replacing individual pieces. The pieces are notched on the corners so that abutting pieces form a circular cut-out to let the light of the projector pass through the cut out portion and form a gridded pattern on the screen or wall The player can thus "see" a clearly projected image of delineated rectangles of $1.5 \times 1.0$. This definition cf individual pieces makes it easier for pieces to be selected in the Play of the game by assigning the appropriate letter and numeral from the matrix projected on the screen.

The apparatus can be adapted to a variety of classroom situations and can be tailor-made for every educational need. The basic kit includes 40 specially designed, durable "cover-up" pieces used to block out each of the 40 grid areas. There may be a number of original transparencies—containing messages written in rebus pictographs and memory-match word grids to be played as a memory game. The latter acts as a motivator to drill and reinforce truths or memory verses, while the rebus transparencies serve to challenge youngsters to use inferential reasoning skills to successfully decode messages. A message will unfold as students choose sections of the rebus to be uncovered, thereby exposing hidden picture clues, one piece-at-a-time.

I claim:

1. Educational apparatus for use with an overhead projector comprising,
   a transparent grid with horizontal and vertical indices for projecting a grid on a wall screen,
   a plurality of removable cover pieces keyed to the grid to cover up grid segments whereby when the transparent grid has pictorial material a student may project a particular grid segment by picking up the cover piece on that segment, the cover pieces having corner notches so that abutting pieces form circular cutouts in order to project the grid configuration onto the wall screen while the covered pieces are covering the transparent grid.

* * * * *